United States Patent
Nagao et al.

(10) Patent No.: US 9,713,805 B2
(45) Date of Patent: Jul. 25, 2017

(54) EXHAUST GAS PURIFICATION CATALYST AND EXHAUST GAS PURIFICATION CATALYST STRUCTURE

(71) Applicants: MITSUI MINING & SMELTING CO., LTD., Tokyo (JP); KUMAMOTO UNIVERSITY, Kumamoto (JP)

(72) Inventors: Yuki Nagao, Saitma (JP); Hironori Iwakura, Saitama (JP); Michiyo Inoue, Saitama (JP); Yunosuke Nakahara, Saitama (JP); Masato Machida, Kumamoto (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days.

(21) Appl. No.: 15/035,576

(22) PCT Filed: Nov. 10, 2014

(86) PCT No.: PCT/JP2014/079750
§ 371 (c)(1),
(2) Date: May 10, 2016

(87) PCT Pub. No.: WO2015/083498
PCT Pub. Date: Jun. 11, 2015

(65) Prior Publication Data
US 2016/0288097 A1    Oct. 6, 2016

(30) Foreign Application Priority Data
Dec. 4, 2013  (JP) ................................. 2013-251530

(51) Int. Cl.
| | | |
|---|---|---|
| *B01J 23/44* | (2006.01) | |
| *B01D 53/94* | (2006.01) | |
| *B01J 37/02* | (2006.01) | |
| *B01J 23/40* | (2006.01) | |
| *B01J 23/89* | (2006.01) | |
| *B01J 21/06* | (2006.01) | |
| *B01J 21/08* | (2006.01) | |
| *B01J 23/745* | (2006.01) | |
| *B01J 35/00* | (2006.01) | |
| *F01N 3/10* | (2006.01) | |

(52) U.S. Cl.
CPC ............ *B01J 23/44* (2013.01); *B01D 53/945* (2013.01); *B01J 21/063* (2013.01); *B01J 21/066* (2013.01); *B01J 21/08* (2013.01); *B01J 23/40* (2013.01); *B01J 23/745* (2013.01); *B01J 23/8906* (2013.01); *B01J 35/0006* (2013.01); *B01J 37/0244* (2013.01); *B01J 37/0248* (2013.01); *B01D 2255/1021* (2013.01); *B01D 2255/1023* (2013.01); *B01D 2255/1025* (2013.01); *B01D 2255/1026* (2013.01); *B01D 2255/2092* (2013.01); *B01D 2255/20707* (2013.01); *B01D 2255/20715* (2013.01); *B01D 2255/20738* (2013.01); *B01D 2255/30* (2013.01); *B01D 2255/707* (2013.01); *B01J 2523/00* (2013.01); *F01N 3/101* (2013.01); *Y02T 10/22* (2013.01)

(58) Field of Classification Search
CPC . B01J 21/02; B01J 21/042; B01J 21/04; B01J 21/063; B01J 21/066; B01J 21/08; B01J 23/42; B01J 23/44; B01J 23/462; B01J 23/464; B01J 23/745; B01J 23/8906; B01J 32/00; B01J 35/0006; B01D 2255/1021; B01D 2255/1023; B01D 2255/1025; B01D 2255/1026; B01D 2255/2092; B01D 2255/20707; B01D 2255/20738; B01D 2255/20715; B01D 53/945
USPC ......................................... 502/202, 207, 325
See application file for complete search history.

(56) References Cited

U.S. PATENT DOCUMENTS

| | | | | | |
|---|---|---|---|---|---|
| 2,118,143 | A | * | 5/1938 | Benner ................... | C04B 33/13 423/279 |
| 3,983,052 | A | * | 9/1976 | McArthur .......... | B01D 53/9445 502/26 |
| 3,998,930 | A | * | 12/1976 | McArthur ............ | B01D 53/945 423/213.5 |
| 4,053,434 | A | * | 10/1977 | McArthur .......... | B01D 53/9409 423/213.5 |
| 4,091,072 | A | * | 5/1978 | McArthur ............ | B01D 53/945 422/211 |
| 7,892,623 | B2 | | 2/2011 | Ohno | |
| 8,263,032 | B2 | | 9/2012 | Andersen | |
| 8,603,423 | B2 | | 12/2013 | Andersen | |
| 8,609,047 | B2 | | 12/2013 | Dotzel | |

(Continued)

FOREIGN PATENT DOCUMENTS

| | | |
|---|---|---|
| CN | 1883792 A | 12/2006 |
| CN | 102821836 A | 12/2012 |

(Continued)

OTHER PUBLICATIONS

International Search Report, PCT/JP2014/079750, Jan. 13, 2015.

*Primary Examiner* — Patricia L Hailey
(74) *Attorney, Agent, or Firm* — Young & Thompson

(57) ABSTRACT

A catalyst for exhaust gas purification includes a carrier and a platinum group element supported on the carrier. The carrier includes a modified aluminum borate which contains an aluminum borate and at least one of oxides of an element selected from the group consisting of Zr, Si, Fe, and Ti. The modified aluminum borate contains the oxide in a concentration of 0.06% to 18% by mass relative to the mass of the modified aluminum borate.

19 Claims, No Drawings

(56) References Cited

U.S. PATENT DOCUMENTS

| | | |
|---|---|---|
| 8,641,993 B2 | 2/2014 | Dotzel |
| 8,815,190 B2 | 8/2014 | Dotzel |
| 9,040,003 B2 | 5/2015 | Andersen |
| 9,283,519 B2 | 3/2016 | Collier |
| 2013/0116115 A1* | 5/2013 | Sato .................... B01D 53/945 502/207 |
| 2014/0243191 A1* | 8/2014 | Sato .................... B01D 53/945 502/207 |

FOREIGN PATENT DOCUMENTS

| | | |
|---|---|---|
| JP | 07-31879 | 2/1995 |
| JP | 2002-370035 | 12/2002 |
| WO | WO 2012/005375 | 1/2012 |
| WO | WO 2013/039037 | 3/2013 |
| WO | WO 2014/175349 | 10/2014 |

\* cited by examiner

EXHAUST GAS PURIFICATION CATALYST AND EXHAUST GAS PURIFICATION CATALYST STRUCTURE

TECHNICAL FIELD

This invention relates to a catalyst for exhaust gas purification and a catalyst structure for exhaust gas purification. More particularly, it relates to a catalyst for exhaust gas purification excellent in sulfur resistance and a catalyst structure having the catalyst.

BACKGROUND ART

Exhaust gases emitted from internal combustion engines such as automobiles include harmful components, such as hydrogen carbide (BC), carbon monoxide (CO), and nitrogen oxides ($NO_x$). Three-way catalysts have conventionally been used to detoxify the exhaust emissions.

Conventional three-way catalysts have a noble metal such as, Pt, Pd, and Rh as a catalytically active component, and a carrier such as, alumina, ceria, zirconia, and ceria-zirconia composite oxide having oxygen storage ability. As a catalyst substrate, a ceramic or metallic material having the form of honeycomb, plate, pellets, and the like is used.

With the ever tightening of car emission control, the demands for Pt and Rh, which are the main catalytically active components of catalysts for purifying emissions from inert combustion engines, have been increasing, and their prices have been escalating. In particular, the price of Rh is largely varying. Therefore, using Pd, which is less expensive than other noble metals, in substitution for Rh has been desired. It has been studied to use relatively inexpensive Pd as a catalytically active component thereby to reduce the cost of catalysts for exhaust gas purification. Various means have been proposed in this regard. Among them is the proposal to use aluminum borate as a carrier (see Patent Literature 1 below). According to Patent Literature 1, a pellet of hollow aluminum borate powder having a shell of aluminum borate whisker is used as a carrier, on which a catalyst component is supported. Because the catalyst proposed has the improved gas diffusibility, it exhibits more excellent catalytic performance. However, aluminum borate whiskers described above have a needle shape and thus the whiskers have a small specific surface area, and cannot avoid a problem that the long time use causes the aggregate of the precious metal, as a catalyst for exhaust gas purification. As a solution of this problem, the inventors of the present invention previously developed a catalyst using specific aluminum borate as a carrier (see Patent Literatures 2 and 3 below).

CITATION LIST

Patent Literature

Patent Literature 1: JP 2002-370035A
Patent Literature 2: JP 2012-16685A
Patent Literature 3: JP 2013-75286A

SUMMARY OF INVENTION

Technical Problem

It is known that the Pd component included in the catalyst reduces in catalyst performance due to sulfur poisoning. To improve sulfur resistance is a big challenge in the development of an exhaust gas purification catalyst.

It is an object of the invention to provide a sulfur-resistant catalyst for exhaust gas purification having an aluminum borate carrier and a structure having the same.

Solution to Problem

The inventors have conducted extensive investigations with a view to accomplishing the above object and, as a result, found that the sulfur resistance of the catalyst is improved by modifying aluminum borate having a cage structure with a compound having an acidic element, such as $ZrO_2$, $SiO_2$, $Fe_2O_3$, or $TiO_2$.

Accordingly, the present invention relates to a catalyst for exhaust gas purification including a carrier and a platinum group element supported on the carrier, the carrier including a modified aluminum borate which contains aluminum borate and at least one of oxides of an element selected from the group consisting of Zr, Si, Fe, and Ti, and the modified aluminum borate containing the oxide in a concentration of 0.06% to 18% by mass relative to the mass of the modified aluminum borate.

In the catalyst for exhaust gas purification, the platinum group element supported on the carrier is preferably at least one of Pd, Pt, Rh, and Ru.

Further, the present invention relates to a catalyst structure for exhaust gas purification including: a catalyst support made of a ceramics or a metallic material; and a layer of the catalyst for exhaust gas purification according to claim 1 or 2 supported on the catalyst support.

The characteristics, processes for the preparation, and the like of aluminum borate are described, e.g., in Siba P. Ray, J. Am. Ceram. Soc., "Preparation and Characterization of Aluminum Borate", 75 (9), p 2605-2609 (1992).

While aluminum borate has hitherto been represented by formula: $9Al_2O_3.2B_2O_3$ ($Al_{18}B_4O_{33}$), Martin, et al. report in *Journal of Solid State Chemistry*, "Crystal-Chemistry of Mullite-type Aluminoboates $Al_{18}O_4O_{33}$ and $Al_5BO_9$: A Stoichiometry Puzzle", 184 (2011), 70-80 that the results of crystal structure analysis permit representing aluminum borate by formula: $Al_5BO_9$ ($5Al_2O_3:B_2O_3$, $Al_{20}B_4O_{36}$), i.e., formula: $10Al_2O_3.2B_2O_3$, so that aluminum borate can be represented by both the formulae $9Al_2O_3.2B_2O_3$ ($Al_{18}B_4O_{33}$) and $Al_5BO_9$ ($5Al_2O_3:B_2O_3$, $Al_{20}B_4O_{36}$), namely these are the same substance.

Accordingly, the aluminum borate that can be used in the invention includes $10Al_2O_3.2B_2O_3$ ($5Al_2O_3:B_2O_3$, $Al_{20}B_4O_{36}$) and $9Al_2O_3.2B_2O_3$ ($Al_{18}B_4O_{33}$). Such aluminum borate is identified by X-ray diffractometry (XRD) to be $10Al_2O_3.2B_2O_3$ and is also present in another form represented by formula $9Al_2O_3.2B_2O_3$ ($Al_{18}B_4O_{33}$) as a standard chart of XRD. That is, the aluminum borate for use in the invention contains at least one or both of one identified to be $10Al_2O_3.2B_2O_3$ and one identified to be $9Al_2O_3.2B_2O_3$ ($Al_{18}B_4O_{33}$).

Advantageous Effects of Invention

The exhaust gas purification catalyst of the invention exhibits excellent sulfur resistance and purification performance after sulfur poisoning.

DESCRIPTION OF EMBODIMENTS

The carrier used in the catalyst for exhaust gas purification according to the invention includes a modified aluminum borate which contains aluminum borate and at least one oxide of an element selected from the group consisting of Zr, Si, Fe, and Ti. Because the so modified aluminum borate has the acidic element on its surface to show enhanced surface acidity on its surface, it is assumed to be less susceptible to sulfur attack, whereby deactivation of a platinum group element, such as Pd, supported on the modified aluminum borate, is prevented. It is preferred for the aluminum borate to have a cage structure.

It is preferred for the modified aluminum borate particles to have a log differential pore volume distribution peak in a pore volume diameter range of from 20 nm to 100 nm, more preferably from 25 nm to 70 nm, in the pore size distribution measured with a mercury porosimeter. When the peak is in the pore volume diameter range of 20 nm or greater, clogging of pores by accumulation of sulfur included in exhaust gas hardly occurs so that the catalyst exhibits excellent sulfur resistance. Consequently, the noble metal supported on the catalyst carrier is effectively prevented from reducing in catalyst performance. The pore volume diameter of 100 nm is considered to be the upper limit of the pore volume distribution peak reachable in manufacturing.

Examples of the platinum group element include ruthenium (Ru), rhodium (Rh), palladium (Pd), osmium (Os), iridium (Ir), and platinum (Pt). At least one of these platinum group elements are used as the catalyst component for purifying exhaust gases. The invention is particularly effective when applied to the catalyst for exhaust gas purification containing Pd.

The content of the oxide of the modifying element is preferably 0.06% to 18%, more preferably 0.10 to 10%, by mass relative to the oxide-supporting modified aluminum borate. At a lower content, the effect expected of the modification is not sufficiently produced. On the other hand, at a higher content, the platinum group element would be supported on the oxide present on the surface, resulting in reduction of the effect as an active species. The oxide of the modifying element may be used in the catalyst for exhaust gas purification according to the invention whether it is crystalline or amorphous.

The catalyst for exhaust gas purification according to the invention includes the carrier containing the modified aluminum borate and a platinum group element supported on the carrier. The amount of the platinum group element to be supported in terms of the mass of the platinum group metal is preferably 0.1% to 5%, more preferably 0.2% to 4%, by mass relative to the mass of the carrier. Compared with a catalyst having a platinum group element supported on $CeO_2$—$ZrO_2$ having oxygen storage capacity and a catalyst having a platinum group element supported on La-stabilized alumina, the catalyst having the platinum group element supported on the modified aluminum borate protects the platinum group element against reduction in degree of dispersion and against sintering after high temperature aging.

The catalyst structure for exhaust gas purification according to the invention includes: a catalyst support made of a ceramics or a metallic material; and a layer of the catalyst for exhaust gas purification according to the invention formed and supported on the catalyst support. The amount of the catalyst to be supported is preferably 70 to 350 g/L, more preferably 100 to 300 g/L. While the catalyst support made of a ceramics or a metallic material in the catalyst structure for exhaust gas purification is not particularly limited in shape, it is usually honeycomb-shaped, plate-shaped, or pellet-shaped, preferably honeycomb-shaped. Examples of the materials making up the catalyst support include ceramics, such as alumina ($Al_2O_3$), mullite ($3Al_2O_3$—$2SiO_2$), and cordierite ($2MgO$—$2Al_2O_3$—$5SiO_2$); and metallic materials, such as stainless steel.

An embodiment of the catalyst structure for exhaust gas purification according to the invention is a structure composed of the catalyst support made of a ceramics or a metallic material, a lower layer containing the catalyst for exhaust gas purification according to the invention supported on the catalyst support, and a catalyst layer (upper layer) containing Rh provided on the lower layer. In the embodiment, Pd is chosen as a platinum group element which is to be supported on the catalyst of the lower layer. The amount of Rh included in the Rh-containing catalyst layer is preferably 0.05% to 2.0%, more preferably 0.05% to 1.5%, by mass based on the mass of the carrier of the Rh-containing catalyst layer, e.g., zirconium oxide or aluminum oxide. The Pd to Rh ratio in this embodiment of the catalyst structure for exhaust gas purification is preferably 1:3 to 50:1, more preferably 1:2 to 40:1. The amount of the lower layer to be supported is preferably 70 to 250 g/L, more preferably 100 to 200 g/L. The amount of the upper layer to be supported is preferably 30 to 150 g/L, more preferably 50 to 100 g/L, taking into consideration heat resistance, gas diffusibility into the lower layer, exhaust pressure, and the like.

The catalyst for exhaust gas purification according to the invention is prepared by: mixing aluminum borate and a solution of a modifying element-containing compound that contains at least one element selected from those composing at least one oxide selected from the group consisting of $ZrO_2$, $SiO_2$, $FeO$, $Fe_3O_4$, $Fe_2O_3$, and $TiO_2$, i.e., at least one element selected from the group consisting of Zr, Si, Fe, and Ti; evaporating the mixture to dryness; firing the solid to make aluminum borate containing the oxide; mixing the resulting modified aluminum borate with a solution of a Pd compound; evaporating the mixture to dryness, and firing the residual solid. These steps will then be described in detail. In the description and claims, while the solvent that constitutes a "solution" is not particularly limited as long as it is capable of forming a solution, water is usually used as a solvent.

The aluminum borate represented by formulae $10Al_2O_3 \cdot 2B_2O_3$ or $9Al_2O_3 \cdot 2B_2O_3$ ($Al_{18}B_4O_{33}$) that can be used in the method for producing the catalyst for exhaust gas purification according to the invention is commercially available. It is also prepared on a laboratory scale by, for example, the process below.

In a three-necked flask supported in a water bath at 50° C. are put 1.5 l of a solvent (e.g., 2-propanol, butanol, or ethanol), 200 g of an aluminum alkoxide (e.g., aluminum ethoxide, aluminum isopropoxide, aluminum triisopropoxide, aluminum n-butoxide, aluminum s-butoxide, aluminum t-butoxide, aluminum tributoxide, aluminum phenoxide, or aluminum ethoxyethoxyethoxide) having been ground using an agate mortar, and 40.9 g of a boron alkoxide (e.g., boron n-propoxide, boron trimethylsiloxide, boron ethoxyethoxide, boron vinyldimethylsiloxide, boron allyloxide, boron n-butoxide, boron t-butoxide, boron ethoxide, boron isopropoxide, or boron methoxide) and stirred while purging with nitrogen gas. When aluminum isopropoxide is used as the aluminum alkoxide, 2-propanol is the best solvent to provide manufacturing advantage because aluminum isopropoxide hydrolyzes to form 2-propanol. After the aluminum alkoxide dissolves completely, 24.6 g of a 1:1 mixed solvent of water and a solvent (e.g., 2-propanol) is slowly added thereto dropwise, whereby the aluminum alkoxide hydrolyzes gradually to form a white gelatinous sediment, which is washed with ethanol and then with pure water, followed by filtration. The filter cake is dried at 120° C. overnight (about 15 hours) and fired in air first at 300° C. for 3 hours and then at 1000° C. for 5 hours to yield aluminum borate as a white product. The resulting product can be identified to be aluminum borate having formula $10Al_2O_3 \cdot 2B_2O_3$ or $9Al_2O_3 \cdot 2B_2O_3$ ($Al_{18}B_4O_{33}$) by XRD.

It is possible to prepare the modified aluminum borate by mixing a modifying element-containing compound together with the materials for the preparation of aluminum borate in the above-described production process.

In the preparation of the catalyst for exhaust gas purification according to the invention, the step of mixing aluminum borate with a solution or dispersion of a modifying element-containing compound (e.g., zirconium oxynitrate, zirconium oxychloride, zirconium nitrate, colloidal silica, tetraethoxysilane (TEOS), iron nitrate, iron sulfate, iron acetate, titanium (III) chloride solution, titanium (IV) chloride (solution, or titania sol) may be carried out by mixing a slurry containing aluminum borate and a solution or dispersion of the modifying element-containing compound or adding aluminum borate to a solution or dispersion of the modifying element-containing compound.

Then the mixture is evaporated at 120° C. overnight (about 15 hours) to dryness in a manner that an oxide of the modifying element may adhere to the surface of the boron aluminum almost evenly. The residual solid is fired in air at 600° C. for 3 hours to make an oxide-modified aluminum borate, i.e., the carrier for the catalyst for exhaust gas purification according to the invention.

The thus obtained modified aluminum borate is mixed with a solution of a compound of a platinum group element (soluble compound such as, palladium nitrate, palladium chloride, or palladium sulfate if platinum group element is palladium). In this step, a carrier commonly used in three-way catalysts or a carrier having oxygen storage capacity (OSC), such as $CeO_2$—$ZrO_2$, may be mixed together. At least one platinum group element is used. When two or more platinum group elements are used, they may be supported simultaneously.

The oxide or compound of the modifying element that is contained in the modified boron aluminum used for the invention may be present substitutionally for part of boron or aluminum of the aluminum borate but is preferably present in a form other than substitutional. It is desirable that the modifying element oxide or compound be present as supported by the aluminum borate or as modifying the surface of the aluminum borate, for example, in the form of an oxide on the crystal grain boundaries. When analyzed by, e.g., XRD, such an oxide or compound has no peak shift of aluminum borate but a peak inherent to the oxide or compound of the modifying element.

The mixture is then evaporated at 120° C. overnight (about 15 hours) to dryness in a manner that the platinum element compound may adhere to the surface of the carrier almost evenly. The residual solid is fired in air at 600° C. for 3 hours to make the catalyst for exhaust gas purification according to the invention, i.e., platinum element-supporting modified aluminum borate.

The catalyst structure for exhaust gas purification according to the invention can be prepared by the following method. The modified aluminum borate, a binder, a solution of a platinum element (e.g., Pd) compound, and, if desired, a carrier having oxygen storage capacity (e.g., $CeO_2$—$ZrO_2$) are mixed and wet ground to prepare a slurry. The slurry is applied to a catalyst support made of a ceramics or a metallic material, the catalyst support preferably having a honeycomb shape, dried, and fired in a well-known manner to make a catalyst structure for exhaust gas purification having the catalyst support and a layer of the catalyst for exhaust gas purification supported on the support. A catalyst structure additionally having an Rh catalyst layer on the catalyst layer can be produced in the same manner as described,

EXAMPLES

The invention will now be illustrated in greater detail with reference to Examples and Comparative Examples. Unless otherwise noted, all the parts and percents are by mass.
Preparation of Aluminum Borate:

In a three-necked flask supported in a water bath at 50° C. were put 1.5 l of 2-propanol, 200 g of aluminum isopropoxide having been ground using an agate mortar, and 40.9 g of boron n-propoxide and stirred while purging with nitrogen gas. After the aluminum isopropoxide dissolved completely (after the solution turned clear), 24.6 g of a 1:1 mixture of water and 2-propanol was slowly added thereto dropwise, whereupon the aluminum isopropoxide hydrolyzed gradually to form a white gelatinous sediment, which was washed successively with ethanol and pure water, followed by filtration. The filter cake was dried at 120° C. overnight (about 15 hours) and fired in air first at 300° C. for 3 hours and then at 1000° C. for 5 hours to yield aluminum borate as a white product. The resulting product was identified to be aluminum borate having formula: $10Al_2O_3 \cdot 2B_2O_3$ by XRD.

Example 1

The above prepared aluminum borate was immersed in an aqueous solution of zirconium oxynitrate. The zirconium oxynitrate concentration in the aqueous solution was such that the desired $ZrO_2$-modified aluminum borate ($10Al_2O_3 \cdot 2B_2O_3$) might have a $ZrO_2$ content of 1%. The mixture was evaporated at 120° C. overnight (about 15 hours) to dryness, and the solid was fired in air at 600° C. for 3 hours to give modified aluminum borate having formula: $10Al_2O_3 \cdot 2B_2O_3$ modified with 1% $ZrO_2$.

Ninety-nine parts of the modified aluminum borate containing 1% $ZrO_2$, palladium nitrate of an amount corresponding to 1 part in terms of metallic palladium, and an adequate amount of ion-exchanged water were mixed and stirred to prepare a slurry, which was dried and fired at 500° C. for 1 hour to make Pd-supporting modified aluminum borate.

Example 2

The above prepare aluminum borate was immersed in colloidal silica (Snowtex 040) of such an amount that the desired $SiO_2$-modified aluminum borate might have an $SiO_2$ content of 1%. The mixture was processed in the same manner as in Example 1 to give Pd-supporting modified aluminum borate.

Example 3

The above prepare aluminum borate was immersed in an aqueous iron nitrate solution. The iron nitrate concentration in the aqueous solution was such that the desired $Fe_2O_3$-modified aluminum borate might have an $Fe_2O_3$ content of 1%. The mixture was processed in the same manner as in Example 1 to give Pd-supporting modified aluminum borate.

Example 4

The above prepare aluminum borate was immersed in an aqueous titanium (III) chloride solution. The titanium (III)

chloride concentration in the aqueous solution was such that the desired $TiO_2$-modified aluminum borate might have a $TiO_2$ content of 1%. The mixture was processed in the same manner as in Example 1 to give Pd-supporting modified aluminum borate.

Example 5

Palladium-supporting modified boron aluminum was prepared in the same manner as in Example 2, except that the $SiO_2$ content of the $SiO_2$-modified aluminum borate was changed to 0.06%.

Example 6

Palladium-supporting modified boron aluminum was prepared in the same manner as in Example 2, except that the $SiO_2$ content of the $SiO_2$-modified aluminum borate was changed to 0.10%.

Example 7

Palladium-supporting modified boron aluminum was prepared in the same manner as in Example 2, except that the $SiO_2$ content of the $SiO_2$-modified aluminum borate was changed to 0.50%.

Example 8

Palladium-supporting modified boron aluminum was prepared in the same manner as in Example 2, except that the $SiO_2$ content of the $SiO_2$-modified aluminum borate was changed to 5.00%.

Example 9

Palladium-supporting modified boron aluminum was prepared in the same manner as in Example 2, except that the $SiO_2$ content of the $SiO_2$-modified aluminum borate was changed to 10.00%.

Example 10

Palladium-supporting modified boron aluminum was prepared in the same manner as in Example 2, except that the $SiO_2$ content of the $SiO_2$-modified aluminum borate was changed to 18.00%.

Example 11

Palladium-supporting modified boron aluminum was prepared in the same manner as in Example 3, except that the $Fe_2O_3$ content of the $Fe_2O_3$-modified aluminum borate was changed to 0.06%.

Example 12

Palladium-supporting modified boron aluminum was prepared in the same manner as in Example 3, except that the $Fe_2O_3$ content of the $Fe_2O_3$-modified aluminum borate was changed to 0.10%.

Example 13

Palladium-supporting modified boron aluminum was prepared in the same manner as in Example 3, except that the $Fe_2O_3$ content of the $Fe_2O_3$-modified aluminum borate was changed to 0.50%.

Example 14

Palladium-supporting modified boron aluminum was prepared in the same manner as in Example 3, except that the $Fe_2O_3$ content of the $Fe_2O_3$-modified aluminum borate was changed to 5.00%.

Example 15

Palladium-supporting modified boron aluminum was prepared in the same manner as in Example 3, except that the $Fe_2O_3$ content of the $Fe_2O_3$-modified aluminum borate was changed to 10.00%.

Example 16

Palladium-supporting modified boron aluminum was prepared in the same manner as in Example 3, except that the $Fe_2O_3$ content of the $Fe_2O_3$-modified aluminum borate was changed to 18.00%.

Comparative Example 1

Ninety-nine parts of the above prepared aluminum borate, palladium nitrate of an amount corresponding to 1 part of metallic palladium, and an adequate amount of ion-exchanged water were mixed and stirred to prepare a slurry, which was dried and fired at 500° C. for 1 hour to make Pd-supporting aluminum borate.

Comparative Example 2

Palladium-supporting modified boron aluminum was prepared in the same manner as in Example 2, except that the $SiO_2$ content of the $SiO_2$-modified aluminum borate was changed to 0.03%.

Comparative Example 3

Palladium-supporting modified boron aluminum was prepared in the same manner as in Example 2, except that the $SiO_2$ content of the $SiO_2$-modified aluminum borate was changed to 20.00%.

Comparative Example 4

Palladium-supporting modified boron aluminum was prepared in the same manner as in Example 3, except that the $Fe_2O_3$ content of the $Fe_2O_3$-modified aluminum borate was changed to 0.03%.

Comparative Example 5

Palladium-supporting modified boron aluminum was prepared in the same manner as in Example 3, except that the $Fe_2O_3$ content of the $Fe_2O_3$-modified aluminum borate was changed to 20.00%.

Method of Evaluating Catalyst Performance:

The samples obtained in Examples and Comparative Examples were evaluated for the ability to purify simulated exhaust gas using a fixed bed flow reactor. In a reaction tube was placed 100 mg of the catalyst powder, and a simulated exhaust gas that simulated a complete combustion gas and consisted of CO, $CO_2$, $C_3H_6$, $H_2$, $O_2$, NO, $H_2O$, and the balance of $N_2$ was introduced to the catalyst powder at a total flow rate of 1000 cc/min while heating the reaction tube and the catalyst powder up to 500° C. at a rate of 10° C./min. The gas composition was analyzed with time.

The outlet gas composition was analyzed using a CO/NO analyzer (PG240, available from Horiba, Ltd.) and an HC analyzer (VMF-1000F, available from Shimadzu Corp.).

Accelerated aging of each catalyst simulating sulfur poisoning was conducted at 250° C. for 20 hours at an $O_2$ concentration of 20%, an $H_2O$ concentration of 10%, and an $SO_2$ concentration of 100 ppm.

Method for Evaluating Degree of Dispersion of Platinum Group Element:

The degree of dispersion of Pd used as a platinum group element was determined by CO pulse chemisorption, which is a means known from T. Takeguchi, S. Manabe, R. Kikuchi, K. Eguchi, T. Kanazawa, and S. Matsumoto, Applied Catalysts A:293 (2005), 91. The degree of dispersion of Pd is calculated as a ratio of the amount of Pd (mol) corresponding to the CO adsorption to the total Pd content.

Results of Evaluation of Catalyst Performance and Degree of Dispersion of Pd:

In Table 1 below is shown T50, the temperature at which 50% of CO, HC, and NO were converted, of each catalyst having been subjected to sulfur poisoning aging. It is seen from these results that Examples 1 to 16 are superior in low-temperature (150° C.) activity to Comparative Example 1. With a modifying oxide content of 0.03% as in Comparative Examples 2 and 4, the difference in catalyst performance from Comparative Example 1 is not noticeable. The difference is remarkable when the modifying oxide content is 0.06% as in Examples 5 and 11. When the modifying oxide content is 20% as in Comparative Examples 3 and 5, in contrast, the low-temperature catalyst activity is lower than that in Comparative Example 1, proving that the modifying oxide content as high as 20% has the opposite effect of actually deteriorating the low-temperature activity. With a modifying oxide content of less than 20%, the low-temperature activity increases. Accordingly, the low-temperature activity in Examples 10 and 16, in which the modifying oxide content is 18%, is higher than that in Comparative Example 1.

Sulfur poisoning was carried out in the same manner as in the evaluation of catalyst performance, i.e., at 250° C. for 20 hours at an $O_2$ concentration of 20%, an $H_2O$ concentration of 10%, and an $SO_2$ concentration of 100 ppm.

The far right column in Table 1 shows the results of evaluation of degree of Pd dispersion after sulfur poisoning aging. It is seen that Examples 1 to 16 have a higher degree of Pd dispersion than Comparative Example 1. With a modifying oxide content of 0.03% as in Comparative Examples 2 and 4, the difference from Comparative Example 1 is not noticeable. The difference is remarkable when the modifying oxide content is 0.06% as in Examples 5 and 11. When the modifying oxide content is 20% as in Comparative Examples 3 and 5, in contrast, the low-temperature catalyst activity is equal to or lower than that in Comparative Example 1, proving that the modifying oxide content as high as 20% has the opposite effect of actually deteriorating the degree of Pd dispersion. With a modifying oxide content of less than 20%, the degree of Pd dispersion increases. Accordingly, the degree of Pd dispersion in Examples 10 and 16, in which the modifying oxide content is 18%, is higher than that in Comparative Example 1.

TABLE 1

| | Pd (wt % w.r.t. catalyst-on-carrier) | Aluminum Borate (wt % w.r.t. carrier) | Modifying Element Oxide (wt % w.r.t. carrier) | | | | Conversion Efficiency (T50) (° C.) | | | Degree of Pd Dispersion |
|---|---|---|---|---|---|---|---|---|---|---|
| | | | $ZrO_2$ | $SiO_2$ | $Fe_2O_3$ | $TiO_2$ | CO | HC | NO | |
| Comparative Example 1 | 1 | 100.00 | | | | | 343.0 | 350.1 | 391.9 | 0.05% |
| Example 1 | 1 | 99.00 | 1.00 | | | | 331.7 | 339.6 | 373.6 | 0.16% |
| Example 2 | 1 | 99.00 | | 1.00 | | | 327.0 | 332.9 | 368.7 | 0.27% |
| Example 3 | 1 | 99.00 | | | 1.00 | | 331.2 | 340.7 | 380.9 | 4.52% |
| Example 4 | 1 | 99.00 | | | | 1.00 | 332.0 | 340.8 | 381.2 | 0.15% |
| Comparative Example 2 | 1 | 99.97 | | 0.03 | | | 342.1 | 349.5 | 390.8 | 0.06% |
| Example 5 | 1 | 99.94 | | 0.06 | | | 338.1 | 345.2 | 385.8 | 0.11% |
| Example 6 | 1 | 99.90 | | 0.10 | | | 337.9 | 345.0 | 385.4 | 0.10% |
| Example 7 | 1 | 99.50 | | 0.50 | | | 333.0 | 338.7 | 378.4 | 0.22% |
| Example 8 | 1 | 95.00 | | 5.00 | | | 332.0 | 339.2 | 378.7 | 0.21% |
| Example 9 | 1 | 90.00 | | 10.00 | | | 337.6 | 344.7 | 385.0 | 0.11% |
| Example 10 | 1 | 82.00 | | 18.00 | | | 338.0 | 344.9 | 385.2 | 0.10% |
| Comparative Example 3 | 1 | 80.00 | | 20.00 | | | 353.0 | 362.9 | 410.1 | 0.02% |
| Comparative Example 4 | 1 | 99.97 | | | 0.03 | | 342.7 | 349.3 | 391.8 | 0.07% |
| Example 11 | 1 | 99.94 | | | 0.06 | | 339.0 | 345.7 | 385.7 | 1.50% |
| Example 12 | 1 | 99.90 | | | 0.10 | | 338.9 | 345.5 | 385.9 | 2.52% |
| Example 13 | 1 | 99.50 | | | 0.50 | | 333.3 | 341.1 | 382.5 | 3.64% |
| Example 14 | 1 | 95.00 | | | 5.00 | | 333.7 | 342.5 | 383.1 | 3.78% |
| Example 15 | 1 | 90.00 | | | 10.00 | | 338.7 | 344.9 | 385.3 | 2.59% |
| Example 16 | 1 | 82.00 | | | 18.00 | | 339.0 | 345.6 | 385.7 | 2.30% |
| Comparative Example 5 | 1 | 80.00 | | | 20.00 | | 353.7 | 361.9 | 412.1 | 0.05% |

The invention claimed is:

1. A catalyst for exhaust gas purification comprising a carrier and a platinum group element supported on the carrier,
   the carrier comprising a modified aluminum borate which contains aluminum borate and at least one oxide of an element selected from the group consisting of Zr, Si, Fe, and Ti, and
   the modified aluminum borate containing the oxide in a concentration of 0.06% to 18% by mass relative to the mass of the modified aluminum borate.

2. The catalyst for exhaust gas purification according to claim 1, wherein the platinum group element supported on the carrier is at least one of Pd, Pt, Rh, and Ru.

3. A catalyst structure for exhaust gas purification comprising: a catalyst support made of a ceramics or a metallic material; and a layer of the catalyst for exhaust gas purification according to claim 2 supported on the catalyst support.

4. A catalyst structure for exhaust gas purification comprising: a catalyst support made of a ceramics or a metallic material; and a layer of the catalyst for exhaust gas purification according to claim 1 supported on the catalyst support.

5. The catalyst structure for exhaust gas purification according to claim 4, wherein the platinum group element supported on the carrier comprises Pd.

6. The catalyst structure for exhaust gas purification according to claim 5, further comprising a second catalyst layer that comprises Rh overlying said layer comprising Pd.

7. The catalyst structure for exhaust gas purification according to claim 4, wherein the modified aluminum borate has a cage structure.

8. The catalyst structure for exhaust gas purification according to claim 4, wherein the modified aluminum borate is in the form of particles having a log differential pore volume distribution peak in a pore volume diameter range of from 20 nm to 100 nm in a pore size distribution measured with a mercury porosimeter.

9. The catalyst structure for exhaust gas purification according to claim 8, wherein said pore volume diameter range is from 25 nm to 70 nm.

10. The catalyst structure for exhaust gas purification according to claim 4, wherein the modified aluminum borate contains the oxide in a concentration of 0.10% to 10% by mass relative to the mass of the modified aluminum borate.

11. The catalyst structure for exhaust gas purification according to claim 4, wherein the platinum group element is present in an amount of 0.1% to 5% by mass relative to the mass of the carrier.

12. The catalyst structure for exhaust gas purification according to claim 4, wherein the platinum group element is present in an amount of 0.2% to 4% by mass relative to the mass of the carrier.

13. The catalyst for exhaust gas purification according to claim 1, wherein the platinum group element supported on the carrier comprises Pd.

14. The catalyst for exhaust gas purification according to claim 1, wherein the modified aluminum borate has a cage structure.

15. The catalyst for exhaust gas purification according to claim 1, wherein the modified aluminum borate is in the form of particles having a log differential pore volume distribution peak in a pore volume diameter range of from 20 nm to 100 nm in a pore size distribution measured with a mercury porosimeter.

16. The catalyst for exhaust gas purification according to claim 15, wherein said pore volume diameter range is from 25 nm to 70 nm.

17. The catalyst for exhaust gas purification according to claim 1, wherein the modified aluminum borate contains the oxide in a concentration of 0.10% to 10% by mass relative to the mass of the modified aluminum borate.

18. The catalyst for exhaust gas purification according to claim 1, wherein the platinum group element is present in an amount of 0.1% to 5% by mass relative to the mass of the carrier.

19. The catalyst for exhaust gas purification according to claim 1, wherein the platinum group element is present in an amount of 0.2% to 4% by mass relative to the mass of the carrier.

* * * * *